(12) United States Patent
Stadtfeld

(10) Patent No.: US 12,332,138 B2
(45) Date of Patent: Jun. 17, 2025

(54) RECOGNITION OF TOOTH CONTACT WITH A LUMINESCENT AGENT

(71) Applicant: THE GLEASON WORKS, Rochester, NY (US)

(72) Inventor: Hermann J. Stadtfeld, Manderscheid (DE)

(73) Assignee: THE GLEASON WORKS, Rochester, NY (US)

( * ) Notice: Subject to any disclaimer, the term of this patent is extended or adjusted under 35 U.S.C. 154(b) by 255 days.

(21) Appl. No.: 17/998,941

(22) PCT Filed: May 17, 2021

(86) PCT No.: PCT/US2021/032689
§ 371 (c)(1),
(2) Date: Nov. 16, 2022

(87) PCT Pub. No.: WO2021/242549
PCT Pub. Date: Dec. 2, 2021

(65) Prior Publication Data
US 2023/0168149 A1    Jun. 1, 2023

Related U.S. Application Data

(60) Provisional application No. 63/031,919, filed on May 29, 2020.

(51) Int. Cl.
*G01M 13/021* (2019.01)
*G01N 21/64* (2006.01)

(52) U.S. Cl.
CPC .......... *G01M 13/021* (2013.01); *G01N 21/64* (2013.01); *G01N 2021/6497* (2013.01)

(58) Field of Classification Search
CPC ........ G01M 13/021; G01N 2021/6497; G01N 21/64
See application file for complete search history.

(56) References Cited

U.S. PATENT DOCUMENTS

| 4,618,256 A | 10/1986 | Bartolomeo |
| 5,373,735 A * | 12/1994 | Gutman ............... G01M 13/021 356/23 |

(Continued)

FOREIGN PATENT DOCUMENTS

DE    102017105477 A1    9/2018

OTHER PUBLICATIONS

International Search Report and Written Opinion for PCT/US2021/032689, ISA/EPO, Sep. 1, 2021, 11 pgs.

*Primary Examiner* — Paul M. West
(74) *Attorney, Agent, or Firm* — Robert L. McDowell

(57) ABSTRACT

A method of applying a contrast agent, such as a luminescent contrast agent (e.g. fluorescent, phosphorescent) to the tooth flank surfaces (3, 4) of a gearset (1, 2) wherein the luminescent contrast agent is mixed with transmission oil and is preferably invisible to the human eye. While the members of the gearset roll together, the contrast agent-oil mixture (6) is first introduced into the mesh of the rolling gears. While the mixture is squeezed through the tooth contact, most of the oil is removed in the area of tooth contact. A camera (15), including, as necessary, a filter for certain light wave frequencies, obtains an image which shows the areas with and without luminescent contrast agent. The area (10) where the luminescent contrast agent has been partially or completely removed represents the zone of the tooth contact.

12 Claims, 6 Drawing Sheets

(56) References Cited

U.S. PATENT DOCUMENTS

| | | |
|---|---|---|
| 5,610,994 A | 3/1997 | Stadtfeld et al. |
| 5,662,439 A | 9/1997 | Reese et al. |
| 6,120,355 A | 9/2000 | Stadtfeld et al. |
| 2014/0239194 A1 | 8/2014 | Giangrande et al. |
| 2020/0134773 A1* | 4/2020 | Pinter ................ G01N 21/8806 |

* cited by examiner

RECOGNITION OF TOOTH CONTACT WITH A LUMINESCENT AGENT

FIELD OF THE INVENTION

The invention is directed to the testing of gears and in particular to recognition of tooth contact of the gearset members utilizing a contrast agent such as a luminescent agent.

BACKGROUND OF THE INVENTION

There are many testing procedures known for evaluating bevel and cylindrical gears. Among these testing procedures are single flank and double flank analysis, noise and vibration testing, and, tooth contact analysis. Running (or rolling) a pair of bevel or hypoid gears (i.e. ring gear and pinion) together in mesh for testing purposes in order to determine and analyze their running qualities and/or tooth bearing contact is well known in the art of gearing. Machines for performing such testing are equally known and are generally exemplified by U.S. Pat. No. 6,120,355 for example.

In testing bevel or hypoid gears to determine the pattern of contact between the teeth of the gear pair, it is customary to coat the tooth surfaces of one member of the pair, usually the ring gear member, with a contrast agent known as a marking compound, usually consisting of a fine chalk powder suspended in a carrier substance such as oil, and then run the pair together under a light load. Marking compound will be removed from areas of the ring gear tooth surface which come into contact with tooth surfaces of the mating pinion member resulting in a contact pattern or "footprint" being revealed on the tooth surfaces of the ring gear.

Roll testing machines for cylindrical and bevel gears can conduct automatic measurement of single flank error and structure borne noise for a particular pinion and gear shaft position. FIG. 1 shows a common arrangement with axes noted wherein offset=E, pinion axial position=P, gear axial position=G, and shaft angle=ALPHA. Rotational speed and torque are controlled during the testing. The results are transmission accuracy and vibration readings which are used to rate a gearset with respect to the requirements of a particular application. The gearset testing also requires an evaluation of the tooth contact between the two meshing gears. In order to make the contact zone between the rolling flanks visible, a marking compound is brushed or sprayed onto the convex and concave flank surfaces 3 and 4 of a bevel ring gear 2 prior to the roll testing with a bevel pinion 1. After rolling in certain axis positions, a person has to subjectively judge the position and size of the tooth contact. A single flank test or a structure borne noise evaluation will be meaningful only if the tooth contact is within a specified tolerance regarding position and size.

The necessity of a human tooth contact observation defeats the objective of an automated test cycle on a computer numerical control (CNC) machine. A method of digital contact image recognition is known from U.S. Pat. No. 5,610,994 wherein conventional marking compound may be rolled onto the flank surfaces of the ring gear by an automated brush such as disclosed in U.S. Pat. No. 5,662,439, the disclosures of both patents being hereby incorporated by reference. The brush is supplied with marking compound through a pressure line coming from a compound tank. This system is able to do an automated test in one shaft position. However, it is common to conduct a so-called V-H-check which simulates the deflections of teeth, shafts, bearings and housing under different loads. The marking compound coating which is used to make a center contact visible has to be removed, followed by a re-coating before, for example, a heel or toe contact pattern can be rolled. The task of cleaning and re-coating with marking compound is not addressed by either of the above-cited patents and the absence of such an ability is one reason that a fully automated test procedure is still not possible to date.

A further problem is presented by the fact that gearsets roll tested with marking compound have to be cleaned by a washing cycle before they can be built (i.e. accurately positioned) into a gearbox. Marking compound will contaminate the lubricating oil (e.g. gear oil) in the gearbox housing and change the properties of the oil.

SUMMARY OF THE INVENTION

The invention is directed to a method testing gears comprising applying a contrast agent, such as a luminescent contrast agent (e.g. fluorescent, phosphorescent) to the tooth flank surfaces of a gearset wherein the luminescent contrast agent is mixed with transmission oil (e.g. gear oil) and is preferably invisible to the human eye. While the members of the gearset roll together, the contrast agent-oil mixture is first introduced into the mesh of the rolling gears. While the mixture is squeezed through the tooth contact, most of the oil is removed in the area of tooth contact. A camera, including, as necessary, a filter for certain light wave frequencies, obtains an image which shows the areas with and without luminescent contrast agent. The area where the luminescent contrast agent has been partially or completely removed represents the zone of the tooth contact.

In a preferred embodiment, a method of testing gears comprises:
  providing a first member of a gearset having a plurality of tooth flank surfaces and providing a second member of the gearset having a plurality of tooth flank surfaces,
  rolling the first member of said gearset in mesh with the second member of the gearset and applying a contrast agent to the tooth flank surfaces of at least one of the first and second members of the gearset during the rolling,
  stopping said applying and continuing with said rolling, wherein as a result of the continued rolling after stopping the applying, the contrast agent is removed from applied areas on tooth flank surfaces of at least one of the first and second members where tooth flank surfaces of the first member contact tooth flank surfaces of the second member thereby resulting in a contact pattern being revealed on the tooth flank surfaces of at least one of the first and second gearset members, the contact pattern being indicative of a contact area between meshing tooth flank surfaces of the first and second members of the gearset, and wherein said contrast agent comprises a luminescent agent.

DETAILED DESCRIPTION OF THE PREFERRED EMBODIMENT

Figure 1:
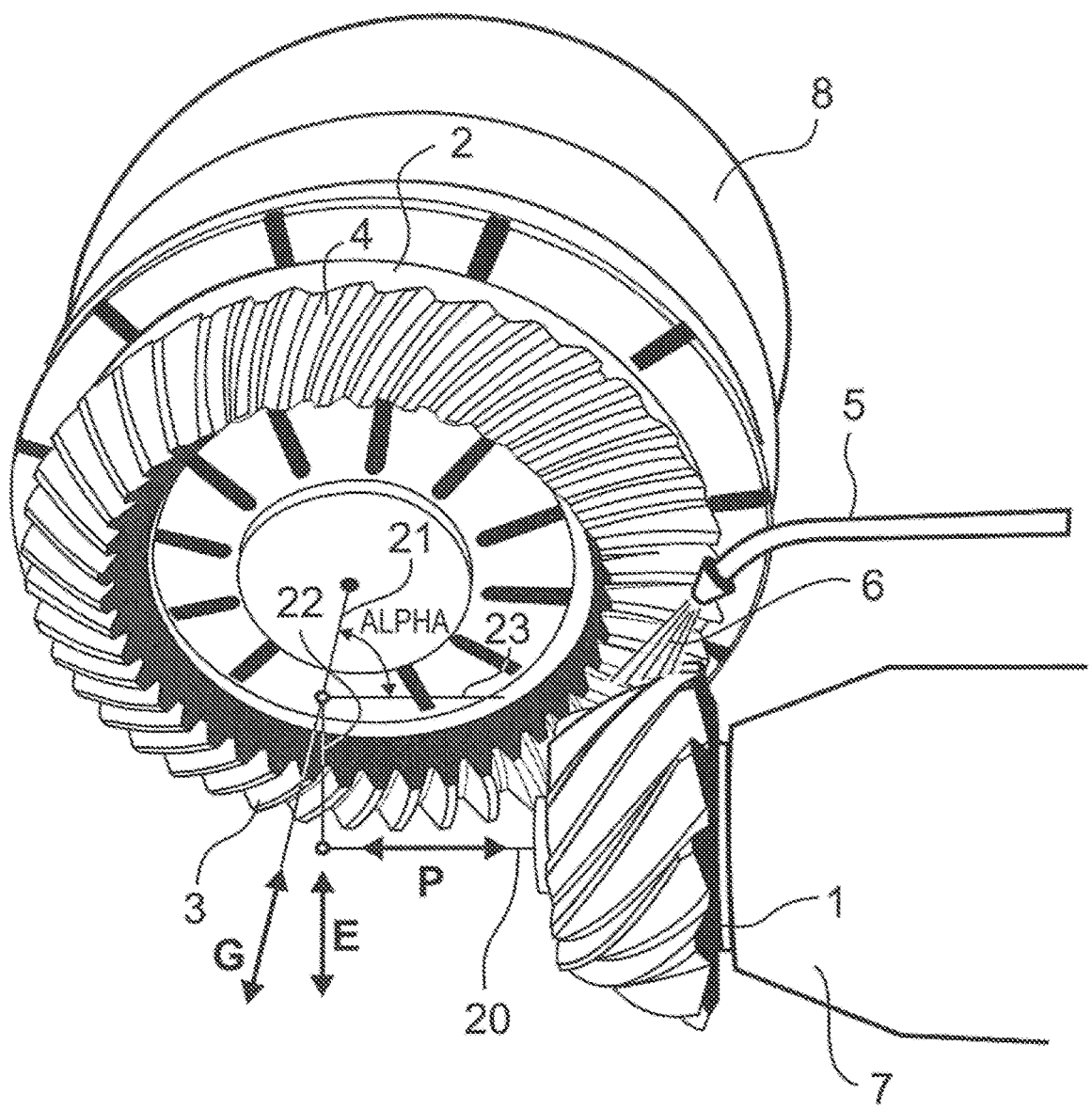
FIG. 1 illustrates roll testing of a hypoid gearset.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. The size and relative sizes of certain aspects or elements may be exaggerated for clarity or detailed explanation purposes. For a better understanding of the invention and ease of viewing, doors, casings, internal or external guarding, etc. may have been omitted from the drawings.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order. As used herein, the singular forms "a", "an" and "the" are intended to include the plural forms as well, unless the context clearly indicates otherwise and the term "and/or" includes any and all combinations of one or more of the associated listed items.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless explicitly stated.

The invention is directed to a method of testing gears by rolling a first member of a gearset in mesh with a second member of the gearset and applying a contrast agent, in the form of a luminescent agent, to at least one member of the gearset. As a result of the rolling, the contrast agent is removed from areas where tooth surfaces of the first member contact tooth surfaces of the second member resulting in a contact pattern being revealed on the tooth surfaces of at least one of the gearset members. The contact pattern is indicative of a contact area between meshing tooth surfaces of the members of the gearset.

The inventive method comprises a contrast agent, preferably a luminescent agent, which is preferably invisible (before excitation with light of a certain wavelength) and does not change the chemical properties of transmission oil (e.g. gear lubricating oil or "gear oil") when mixed together with the oil. Many gear testing machines already use transmission oil in order to conduct roll testing of gears at certain speeds and loads. Transmission oil belongs to the group of hydraulic oils which are anti-foaming and provide wear resistance. If the transmission oil in a roll tester is mixed with a luminescent agent, such as a fluorescent or phosphorescent agent for example, then light, such as ultra-violet light (UV-light), makes the oil layer on the gear surfaces visible.

Examples of suitable luminescent agents include, but are not limited to:

Spectroline® OIL-GLO® UV Fluorescent Dyes-Oil-GLO: 22, 30, 33, 40, 44, 45 or 50 from Spectronics Corporation (Spectroline and OIL-GLO are registered trademarks of Spectronics Corporation, Westbury, NY), and Tracerline® DYE-LITE® UV Fluorescent Dye TP-3900 from Tracer Products (Tracerline and DYE-LITE are registered trademarks of Spectronics Corporation, Westbury, NY).

An example of a suitable transmission (e.g. gear) oil is Mobil DTE 26 with an ISO viscosity grade of 68 and a preferred luminescent contrast agent is the Tracerline® DYE-LITE® UV Fluorescent Dye TP-3900. An example of a preferred transmission oil/contrast agent mixture is, by volume, 200 parts oil: 1 part contrast agent.

FIG. 1 shows a three dimensional view of a gearset comprising bevel pinion 1 and a bevel ring gear 2 mounted to the spindles 7 and 8 of a roll testing machine such as the machine disclosed in U.S. Pat. No. 6,120,355 the disclosure of which is hereby incorporated by reference. The axial position of the pinion 1 is adjusted with a movement in P direction. The ring gear 2 is axially adjusted with a movement in G direction. The vertical distance 22 between the axes 20 and 21 is called the "offset" and E is the movement to adjust the offset. The angle between the axis 21 and line 23 is the shaft angle ALPHA for the gearset. Line 23 is parallel to the axis 20. Tubing 5 supplies a stream of oil mixture 6 in between the two meshing gears 1 and 2.

In order to conduct a tooth contact acquisition, the luminescent agent/oil mixture 6 (referred to hereafter as the oil mixture) is pumped through pipe 5 (FIG. 1) and introduced (e.g. poured, sprayed, etc.) into the tooth mesh 6 while pinion 1 and gear 2 roll with a low speed and with a low torque (e.g. 60 RPM and 10 Nm). Alternatively, the oil mixture may be brushed onto the tooth surfaces of one or both of the gearset members. After the teeth of the gearset are covered with the oil mixture, the oil mixture stream is turned off while the gearset is still rolling. During this part of the cycle the oil mixture is pressed away, or substantially pressed away, from the contacting area or zone 10 of the flank surfaces and only remains in the area surrounding the contact area 11. After the gearset has been rolled multiple revolutions without fresh oil mixture supply, the spindles of the test machine come to a full stop and the spindles withdraw in order to separate pinion 1 and gear 2. The rotational position of the to-be-imaged object (pinion or ring gear or both) is defined to provide optimal conditions for the UV light illumination of a defined section. The defined section can either be one single flank surface or a plurality of tooth flank surfaces.

Figure 2:
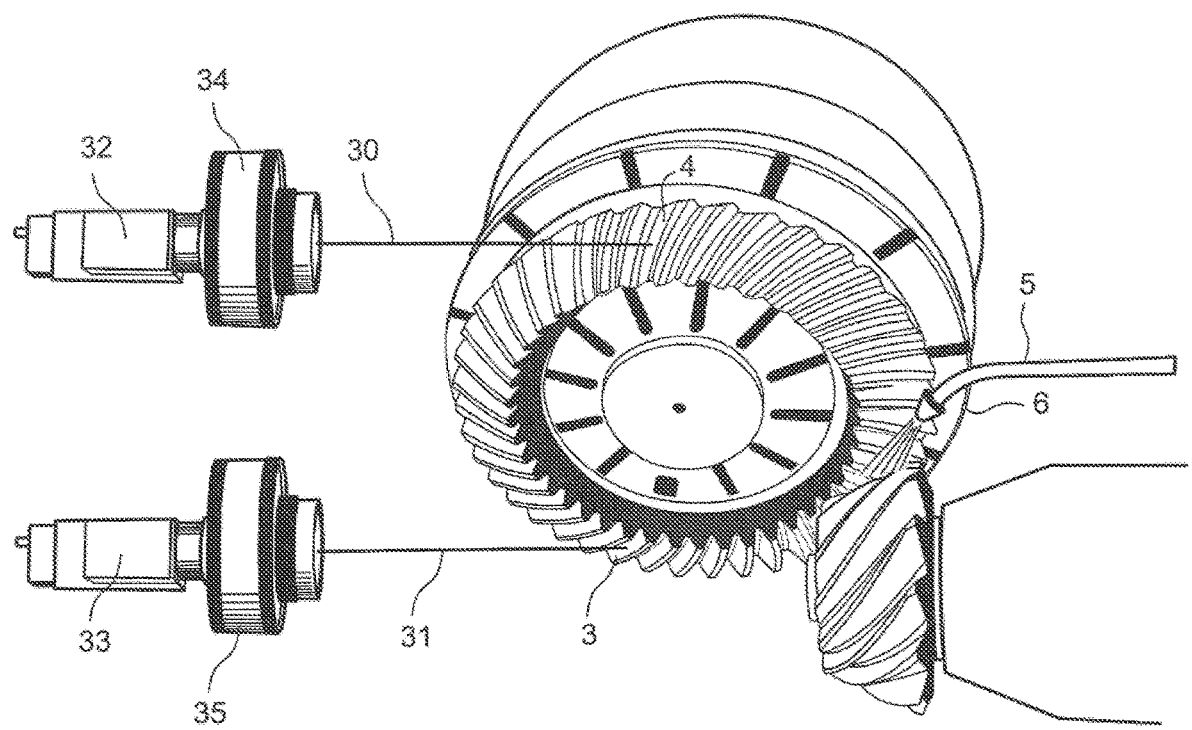
FIG. 2 shows an orientation of cameras and UV lights in roll tester.

FIG. 2 shows a three dimensional view of two cameras 32 and 33 with ring lights 34 and 35. The diffracted light from the tooth flanks 3 and 4 reaches the front of the cameras 33 and 32 along the visibility lines 31 and 30. The visibility lines 31 and 30 are defined in order to give an optimal view of the cameras at the flank surfaces. Due to the visibility blockage of the teeth in front of the observed flanks 3 and 4, a complete and undistorted view is not possible in most cases. Thus, the visibility lines 30 and 31 present a compromise which will still allow all significant tooth contact information to be captured.

Figure 3:
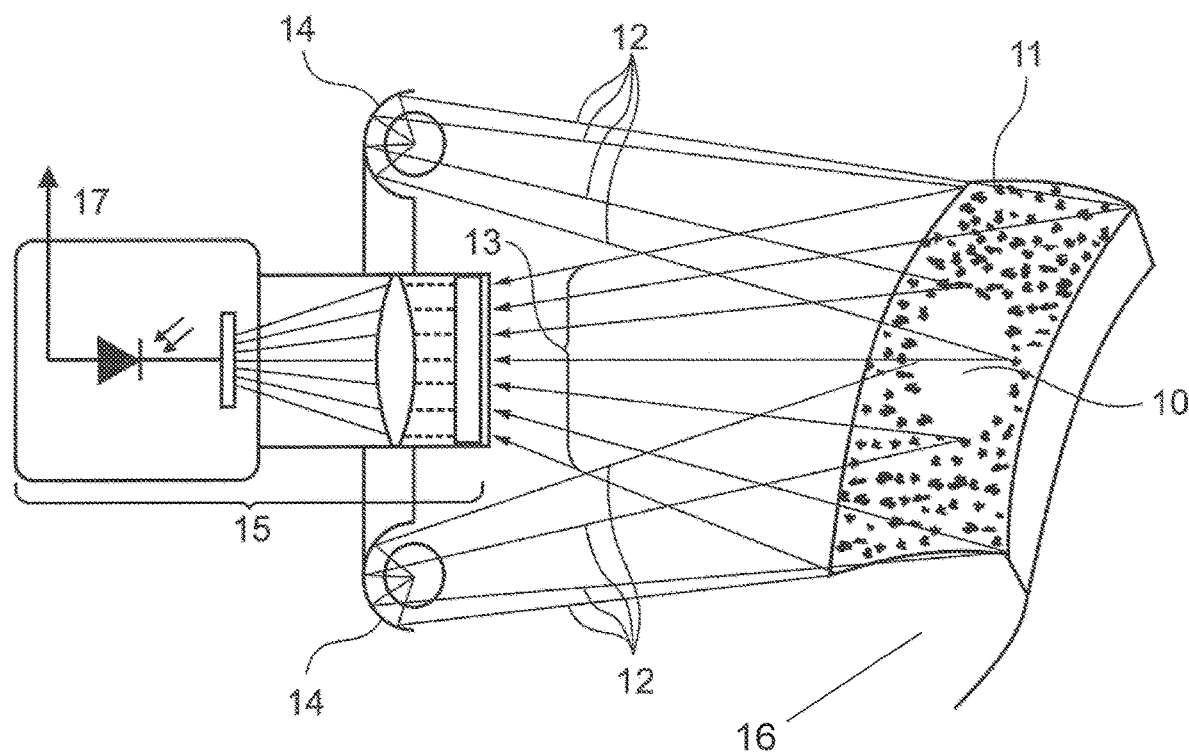
FIG. 3 shows a fluorescent agent and light refraction principle.

FIG. 3 shows a two dimensional view of a camera 15 and a light 14 arrangement as well as a three dimensional view of a gear tooth 16. The gear tooth surface is covered with oil mixture within the area 11 of no tooth contact. However, within the contact area or zone 10 there is only a trace of luminescent oil mixture. The light beam 12 illuminates the area 11 which has a film of oil mixture. The illumination causes a spectrum of refracted UV light and visible light 13 to reach the camera 15. This light spectrum passes first through the UV filter where the UV light is filtered out. Behind the UV filter, visible light reaches the lens and subsequently the light sensing electronics of the camera. The camera signal 17 is transmitted to an image processor.

In the following process step, the beam of an UV light, which is a ring light 14 surrounding the camera 15, illuminates the defined gear section which causes the oil mixture on the tooth surface 11 to refract a spectrum 13 containing visible light and UV light back towards the light source 14 and the camera 15. Only the visible light spectrum of the refracted light is significant for the image analysis. The refracted light can also be recognized by the human eye (which has to be protected with UV light filtering eye glasses). A digital camera 15 with a UV filter mounted in front of the lens is positioned in the center of a ring light source in order to capture the image on the targeted flank surface 11 with good contrast and resolution. The camera 15 can transmit a live image or a discrete picture to a computer with image processing software.

If a bandpass filter is placed in front of the camera lens (instead of a UV filter), then an entire range of wavelengths can be filtered from the refracted light which arrives at the filter. Filtering a range of wavelengths helps to control the elimination of disturbing light reflections for example from a shiny steel surface within the contact area where the layer of oil mixture is very thin or even eliminated.

Another possibility to observe and record a tooth contact can be practiced by using a stroboscope light. If the strobe frequency matches the tooth mesh frequency, then the image seen by the camera is a non-rotating gear with a non-moving tooth contact pattern. Such a test while the spindles rotate is significantly faster compared to the static image acquisition with stopped spindles.

If it is desired to test a gearset in different axes positions (different E, P, G and Alpha positions), then after the image of one spindle position is acquired, one or more of the machine axes move into the next position, more oil mixture is transferred into mesh for several seconds while the gearset rotates. After the oil stream stops, the gearset continues running several revolutions and the image acquisition of this new contact can be performed.

In order to observe the tooth contact in both rotational directions (coast and drive direction) the test machine can change the hand of rotations of the two meshing gears 1 and 2. In the drive direction, the tooth contact pattern is made visible on the convex flank surfaces 4 of the ring gear 2. In the coast direction, the tooth contact pattern is rolled onto the concave flank surfaces 3 of the ring gear.

FIG. 3 shows that the camera 15 can only capture the contact image on either the convex flanks or the concave flanks in one fixed position. In order to capture the contact images in both rotational directions (drive and coast), the camera 15 has to change its position and its viewing direction from 30 to 31 (FIG. 2). This task can be accomplished with a camera 15 mounted to a robot arm or an actuated platform. It is also possible to utilize two different cameras, with one viewing the convex tooth contact pattern and the other viewing the concave tooth contact pattern. In case of two cameras, it is possible to avoid the expensive and complex implementation of a robot. A simple slide can be used which moves the two cameras in a safe distance from the roll testing action and protects them from oil mixture mist contamination.

The image processor receives the photo information in a pixel file. The pixel information is first sent to an image processor with object recognition software, such as, for example, Computer Vision Toolbox™-Camera Calibration and 3-D Vision from MathWorks Corporation. The task of the object recognition software is the distinction between contact area, surrounding flank surface and the boundaries of the tooth. In a following step, an image data computation is used to relate the image to the coordinate system of the tested gear, which allows correlating the flank and tooth contact image to the theoretically generated tooth. In order to correlate the theoretically generated image (i.e. theoretical image) with the real acquired and processed image (i.e. real image), three adjustment steps are preferably carried out. Although the theoretical image and the real image are both defined in the machine coordinate system, size, axial position and rotational position of the theoretical and real image are not matching (see FIG. 4).

Figure 4:
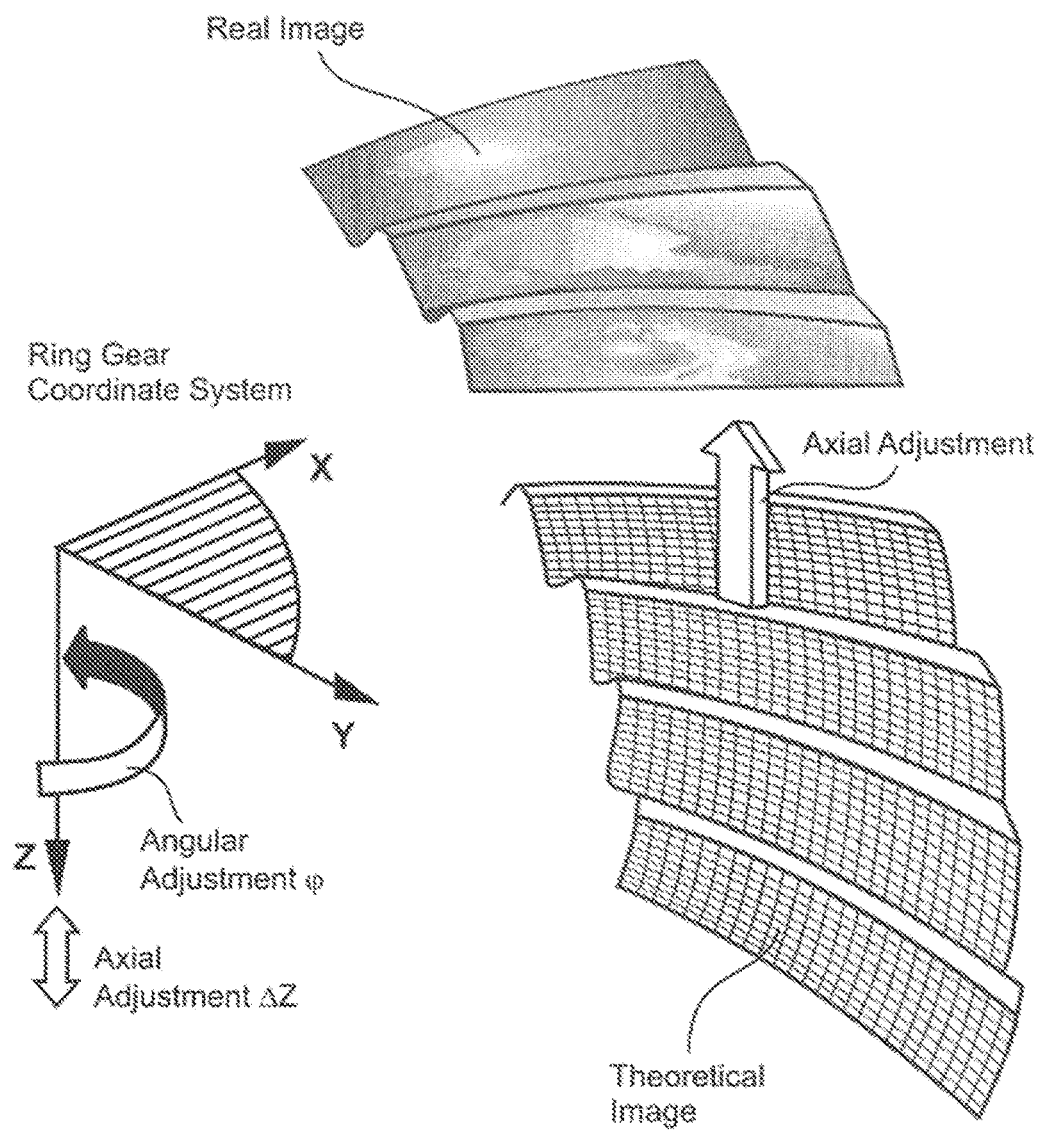
FIG. 4 illustrates a real image and theoretical image in a gear coordinate system.

FIG. 4 shows a three-dimensional graphic of a real acquired image and a theoretically generated image of a gear section. In the left side graphic, the two images are not yet aligned and their sizes are different. The image data computation changes the size, the axial position as well as the rotational angle of the theoretically generated image in an iteration loop in order to establish a match of size, axial position and rotational phase relationship in the X-Y-Z gear coordinate system.

Figure 5:
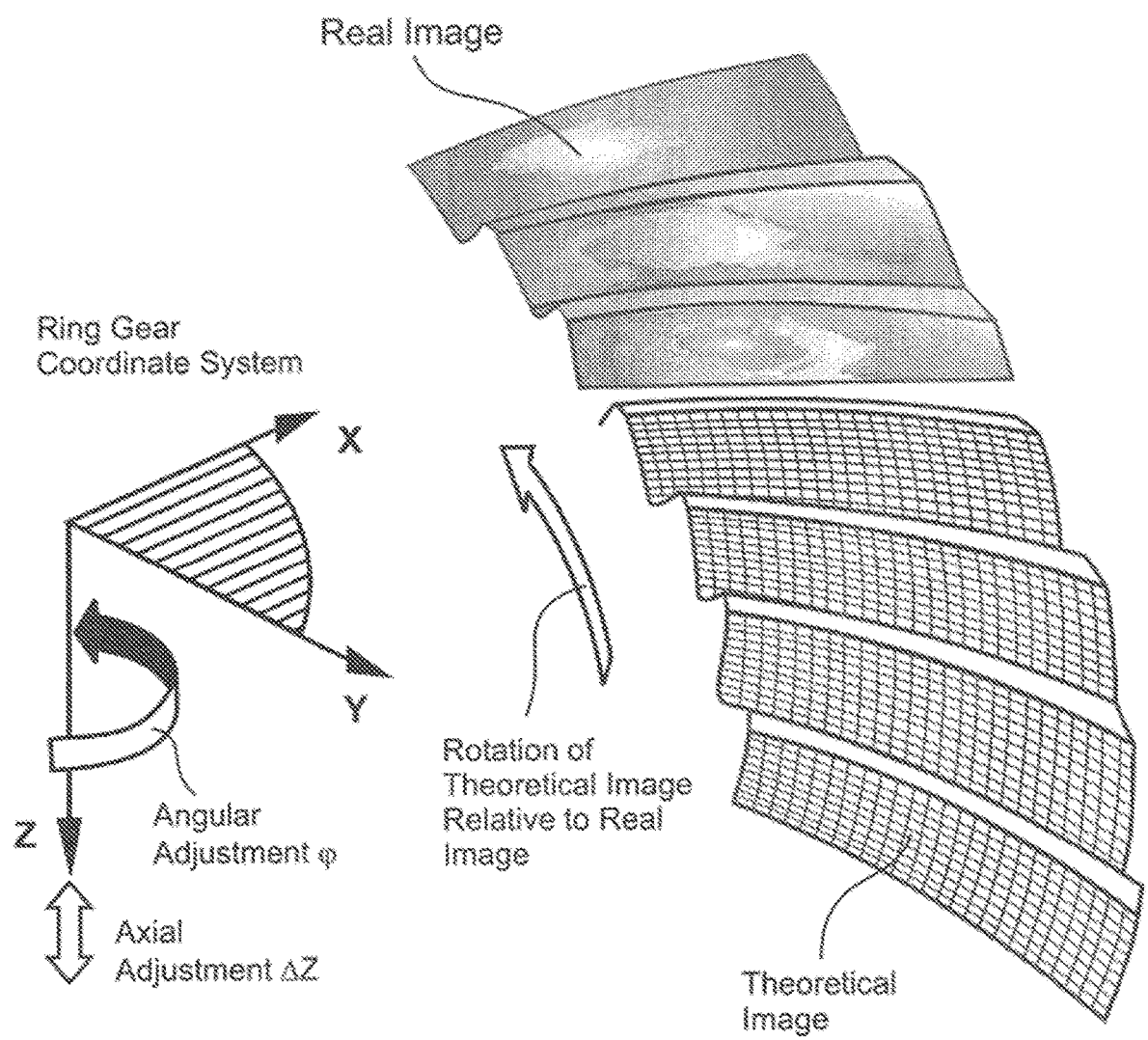
FIG. 5 shows the real image and theoretical image of FIG. 4 after an axial shift.

In a first step, the size of the theoretical image is adjusted to approximately match the size of the real image. In a second step, the theoretical image is axially shifted in Z-direction of the gear coordinate system (indicated in FIG. 4) until it approximately matches the axial position of the real image (result shown in FIG. 5). FIG. 5 shows the three-dimensional graphic of the real image and a theoretically generated image of a gear section of FIG. 4 after axial adjustment of the theoretical image along the Z-axis of the gear coordinate system.

In a third step, the theoretical image is rotated by a transformation process around the Z-axis of the gear coordinate system (indicated in FIG. 5) in order to approximately match the tooth and slot positions of the real image. The result after the rotation of the theoretical image around the Z-axis is shown in FIG. 6.

Figure 6:
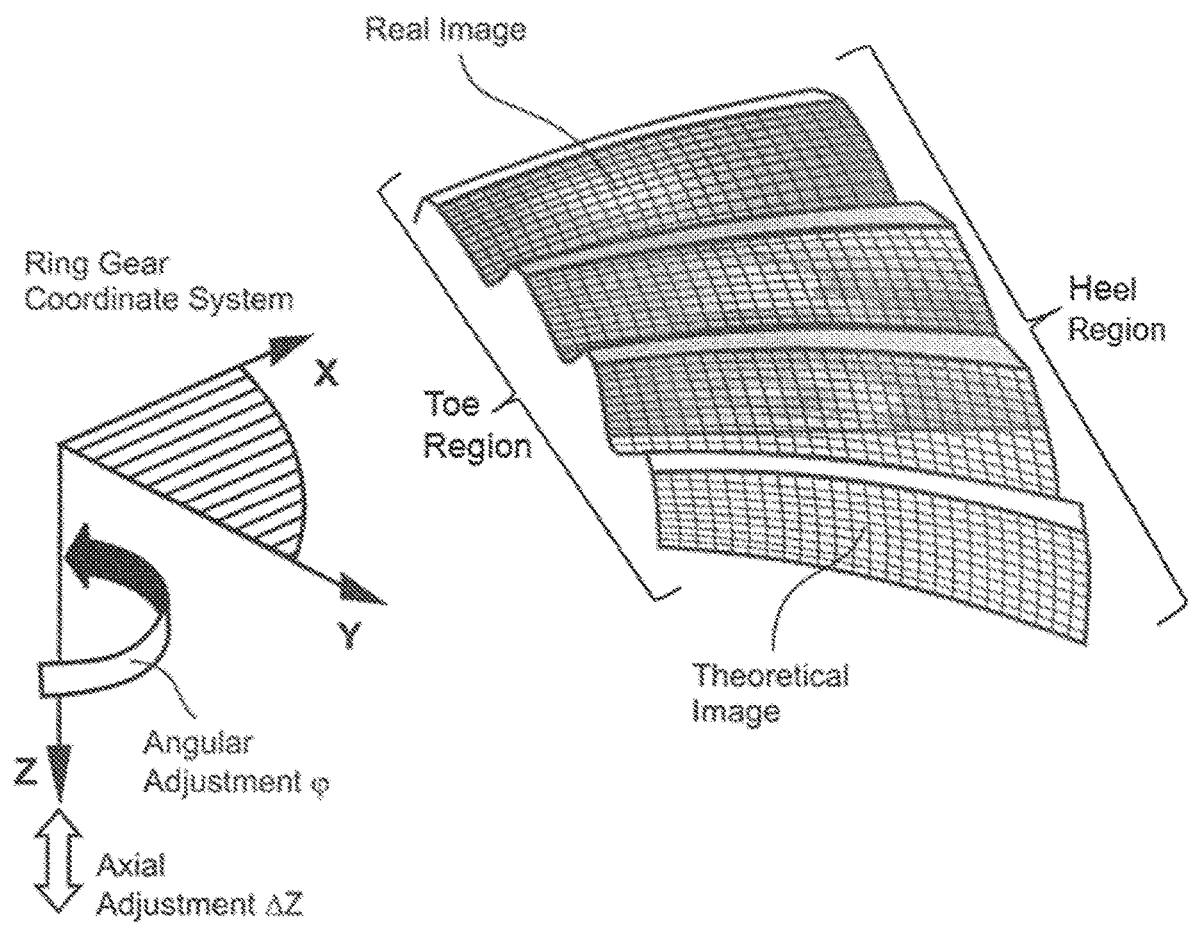
FIG. 6 shows the real image and theoretical image of FIG. 5 after rotation.

FIG. 6 shows the three-dimensional graphic of the real image and a theoretically generated image of a gear section of FIG. 5 after rotational adjustment of the theoretical image around the Z-axis of the gear coordinate system. After this step, the data computation program checks the matching between the real image and the theoretical image in the heel and toe border region. Matching of toe and heel borders is the most effective indication of identical size between real and theoretical image. In FIG. 6, this matching condition is achieved.

In the position of the real image and the theoretical image as shown in FIG. 6, the toe and heel borders of the two images are used as an indicator of a correct and matching size of the theoretical image compared to the real image. The three steps are repeated in an iteration loop until an optimal match within defined tolerances is achieved. The result after the image data computation with matching conditions of the real image and the theoretical image is represented in FIG. 6.

At this point, every pixel of the real tooth image contact can be correlated in the coordinate system of the theoretical image. This makes it possible to calculate the precise position and size of the real tooth contact with respect to the coordinate system of the gear. In order to gain results with increased accuracy, a gear section with a multitude of tooth contacts as shown in FIG. 6 can be processed and evaluated according to a suitable algorithm such as disclosed in U.S. Pat. No. 5,610,994 for example.

Because separate images are acquired for the convex and the concave flanks of the tested gear, the described iteration adjustment of size, axial position and rotational angle between the real image and the theoretical image has to be executed twice.

The inventive device can repeat a test with different axes position E, P, G and Alpha without a required cleaning of tooth flank surfaces. Another test, with changed axes positions, can be started immediately only by adding more luminescent oil mixture on the tooth flank surfaces and repeating the described test cycle.

Although the preferred embodiment of the invention is to introduce the oil mixture into the mesh of rolling gears thereby applying the oil mixture to the tooth surfaces of both members of a gearset, the inventive method also contemplates applying the oil mixture to only one member of a gearset. For example, either a ring gear or a pinion member of a bevel gearset may have the oil mixture applied to the tooth surfaces thereof. Upon rolling the gearset members together in mesh, the oil mixture is pressed away from the contacting area on the oil mixture-applied tooth surfaces (e.g. ring gear) and some of the oil mixture is transferred to the tooth surfaces of the mating non-oil mixture-applied tooth surfaces (e.g. pinion). Therefore, a contact area can be recognized on the tooth surfaces of the oil mixture-applied member and a contact area, or an outline of a contact area, can also be recognized on the mating non-oil mixture-applied member tooth surfaces due to transfer of some oil mixture as the mating tooth surfaces are pressed together during meshing.

The inventive device can be installed in a roll testing machine or it can be used as a standalone unit, for example in order to test the tooth contact pattern after a gearset is assembled in a gearbox but before the transmission cover and the oil pan is installed.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of testing gears on a gear testing machine having a plurality of machine axes, said method comprising:
    providing a first member of a gearset, said first member having a plurality of tooth flank surfaces,
    providing a second member of said gearset, said second member having a plurality of tooth flank surfaces,
    rolling said first member of said gearset in mesh with said second member of said gearset via respective rotating spindles,
    applying a contrast agent comprising a luminescent agent mixed with a transmission oil to the tooth flank surfaces of at least one of the first and second members of said gearset during said rolling,
    stopping said applying and continuing with said rolling for multiple revolutions without fresh transmission oil mixture supply,
    wherein as a result of the continued rolling after stopping the applying, the contrast agent is removed from applied areas on tooth flank surfaces of at least one of the first and second members where tooth flank surfaces of the first member contact tooth flank surfaces of the second member by being pressed away from the contact area, the contact agent remaining in the area surrounding the contact area thereby resulting in a contact pattern being revealed on the tooth flank surfaces of at least one of the first and second gearset members, said contact pattern being indicative of the contact area between meshing tooth flank surfaces of the first and second members of the gearset,
    wherein, after a full stop of the continued rolling and a withdrawal of the spindles to separate the first and second gear members, revealing said contact area by illuminating a single flank surface or a plurality of tooth flank surfaces of at least one of the first and second gearset members in a defined rotational position with ultra-violet light.

2. The method of claim 1 wherein said luminescent agent comprises a fluorescent agent or a phosphorescent agent.

3. The method of claim 1 wherein said luminescent agent does not change chemical properties of the transmission oil.

4. The method of claim 1 further comprising obtaining an image of the illuminated contact area.

5. The method of claim 4 wherein the image is obtained via a camera.

6. The method of claim 5 wherein the camera comprises a camera lens, said camera having a UV-filter or a band pass filter placed in front of the camera lens.

7. The method of claim 1 wherein the tooth surfaces of each of the first and second gear members comprise convex tooth surfaces and concave tooth surfaces and wherein a contact pattern is revealed for at least one of the convex and concave tooth surfaces of at least one of the first and second gearset members.

8. A gear testing machine operable and controllable to test gears according to the method of claim 1.

9. The method of claim 1 wherein the illuminating is done by a ring light source with ring lights.

10. The method of claim 9 wherein a camera is placed in the center of the ring light source.

11. The method of claim 1 wherein said illuminating causes a spectrum of refracted UV-light and visible light.

12. The method according to claim 1 wherein the recited steps are repeated for different machine axes positions of the gear testing machine for a provided gearset.

* * * * *